Jan. 18, 1938.  S. WEISS  2,105,680
TRACTOR
Filed Oct. 15, 1935  3 Sheets-Sheet 1

Inventor:
Samuel Weiss
by F. J. Geisler
Atty.

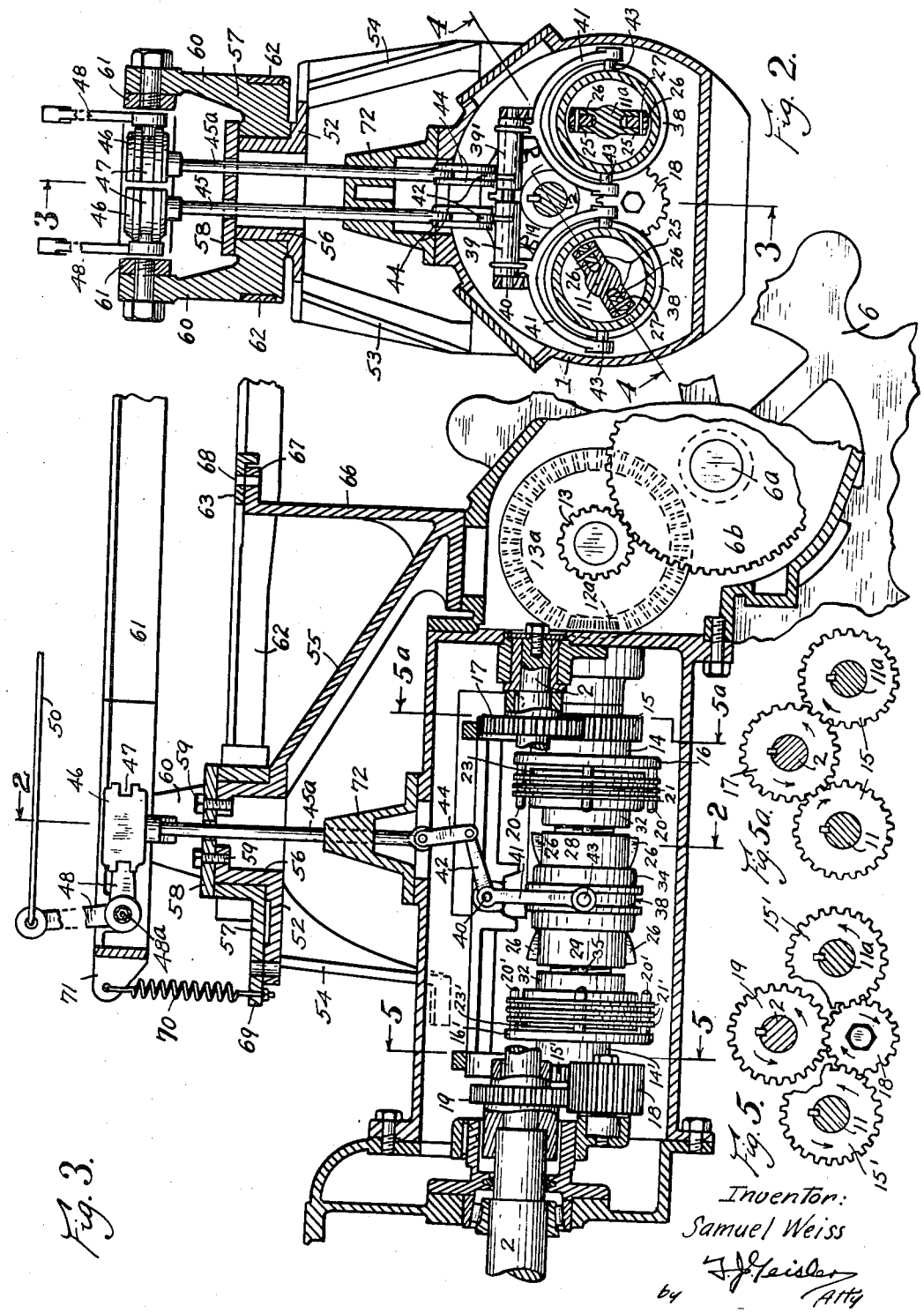

Jan. 18, 1938.  S. WEISS  2,105,680
TRACTOR
Filed Oct. 15, 1935   3 Sheets-Sheet 3
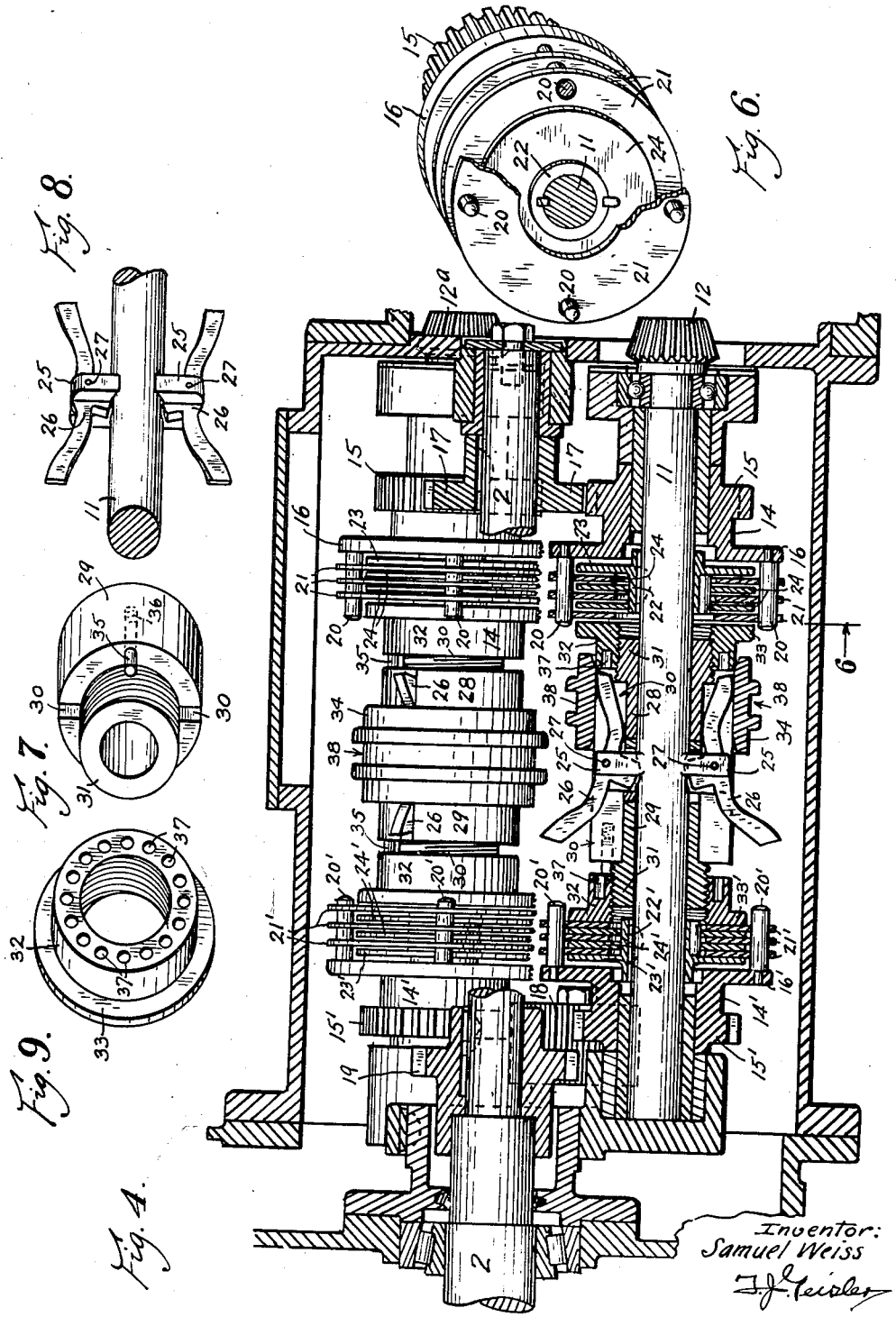
Inventor:
Samuel Weiss Patented Jan. 18, 1938

2,105,680

UNITED STATES PATENT OFFICE 2,105,680

TRACTOR

Samuel Weiss, Portland, Oreg., assignor to Vaughan Motor Co., Inc., Portland, Oreg., a corporation of Oregon Application October 15, 1935, Serial No. 45,105

12 Claims. (Cl. 180—17)

The object of my invention is to provide a clutch mechanism especially designed for motor driven hand guided tractors, which is of simple but sturdy construction, and conveniently operated.

A further object of my invention is to provide a friction clutch mechanism comprising cooperating friction discs and easily operated means for throwing these friction discs into such firm contact as to prevent any inefficient action by slippage of the friction discs when placed in engagement.

A further object of my invention is to make the devices, by which the friction discs are placed into engagement, adjustable so as to take up wear, and be able to apply just the right amount of force to hold the friction discs firmly together when placed in engagement.

A further object of my invention is so to arrange the handle bars of the tractor that the tractor may be conveniently guided and its actions easily controlled under all conditions due to variations in the contour of the ground over which the tractor is run.

A further object of my invention is to provide independent clutch mechanism for each driving wheel of the tractor so that the power of the motor may be applied to either driving wheel separately and thus facilitate the steering of the tractor.

Further features of my invention are hereinafter set forth and described with reference to the accompanying drawings, in which:

Fig. 2 shows a tranverse vertical section taken on the line indicated by 2—2 of Fig. 3 and looking forward, thus to the left, as indicated by the arrows;

Fig. 3 shows a partial vertical, longitudinal section on the line indicated by 3—3 of Fig. 2 illustrating one of the two independent clutch mechanisms driving the rear driving wheels of my tractor, with certain of the parts shown in full;

Fig. 4 is a longitudinal section on planes indicated by the line 4—4 of Fig. 2, looking in the direction indicated by arrows, with parts broken away; in this view the clutch mechanism of one of the clutches has been actuated to cause the rear wheel of the tractor to be driven in one direction by the motor;

Fig. 5 is a diagrammatic cross section corresponding to line 5—5 of Fig. 3, illustrating the gears coupling the left-hand end or forward end of the clutch shafts to the driving shaft of the tractor;

Fig. 5a is a similar diagrammatic cross-section corresponding to the line 5a—5a of Fig. 3 illustrating the coupling of the right hand end or rear end of the clutch shafts to said driving shaft;

Fig. 6 is a perspective view of one of the friction disc assemblies of the clutches; and Figs. 7, 8 and 9 are views in perspective of details of the clutch mechanism.

Figure 1:
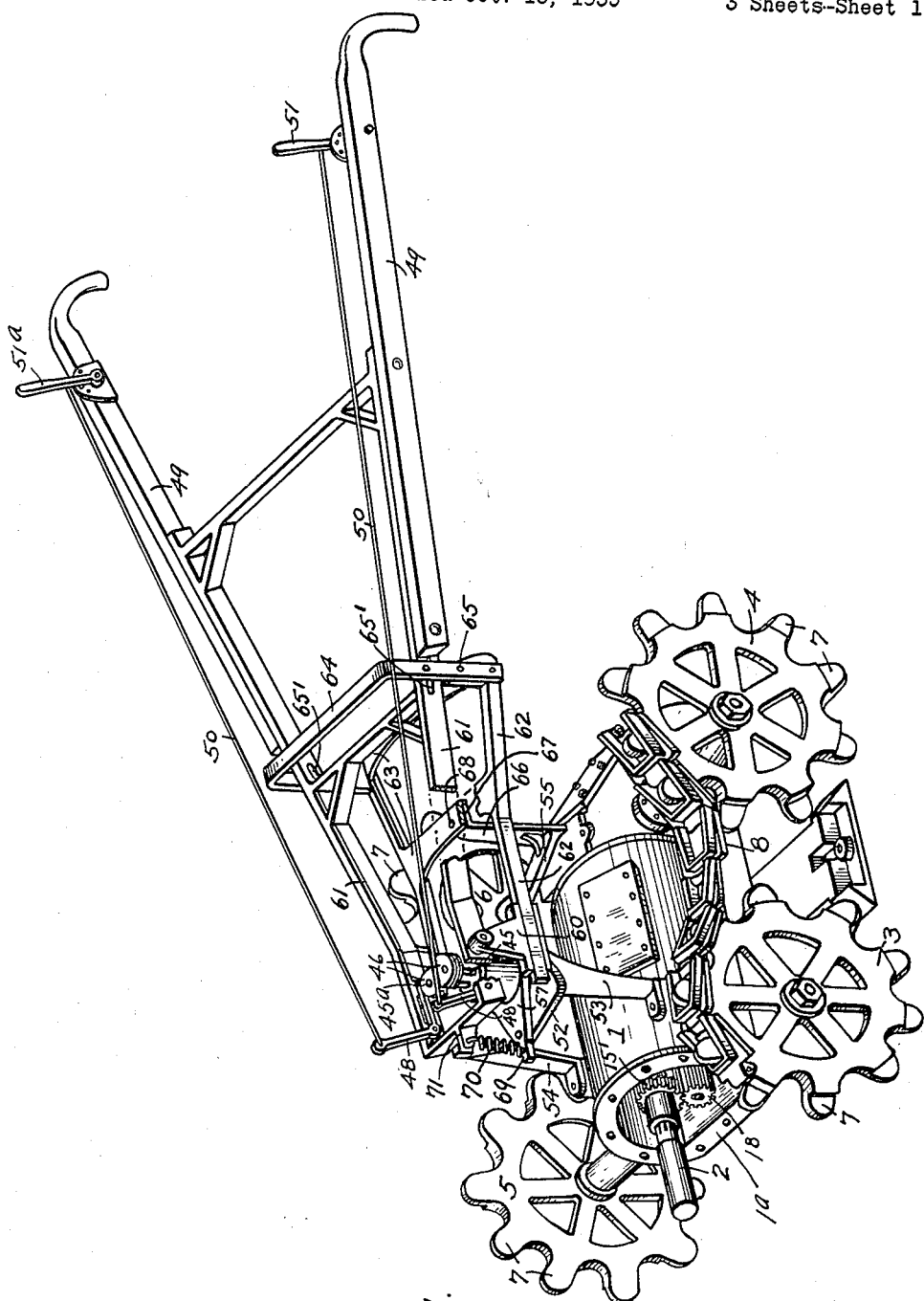
Fig. 1 is a perspective view of my tractor as a whole, with the motor driving the tractor, however, omitted.

Describing first the driving devices of my tractor: The body of my tractor consists of a housing 1 within which are journaled a driving shaft 2, and clutch shafts 11, 11a, see Fig. 2; the clutch shafts carrying the independently operable clutch mechanisms hereinafter described.

On the front end of the housing 1—thus the left end with reference to Fig. 1—is supported a motor, not shown, fastened to the flange 1a of the housing 1, and this motor drives the shaft 2 in the usual manner. The tractor wheels are indicated by 3, 4, 5 and 6, and are of the usual sprocket-type having circumferential lugs 7, on which ride the links of the endless link-belts 8, on both sides of the tractor.

The rear sprocket wheels 4 and 6 are, respectively, fast on stub shafts, one of which is indicated by 6a, in Fig. 3, and these stub-shafts are journaled in suitable bearings in the housing 1. Each of these stub shafts is provided on its inner end with a gear such as 6b, meshing with a spur pinion 13, integral with a gear 13a, which meshes with a bevel pinion 12a fast on a clutch shaft 11a for example, as illustrated in Fig. 3 with reference to the stub shaft of the wheel 6. The driving coupling of the tractor wheel 4 is similarly arranged.

In the preferred construction of my tractor the wheels 4 and 6 are independently driven by means of clutch mechanisms similar in operation, one of such clutch mechanisms being illustrated in Fig. 3. By this construction the driving power can also be applied for steering the tractor.

The clutch mechanisms carried by the clutch shafts 11 and 11a, respectively, are identical. Each clutch mechanism comprises a longitudinal shaft (11, 11a) journaled in suitable bearings within the housing 1. Each of said clutch shafts 11, 11a has bevel pinions 12 or 12a, above referred to, mounted on its rear end, i. e. the right-hand end with respect to Figs. 1, 3 and 4.

At opposite ends on both of the clutch shafts 11, 11a are rotatably mounted sleeves 14, 14', see Fig. 4, each of which sleeves has a circumferential flange 16, 16', and peripheral gear teeth 15 and 15'. The gear teeth 15 of the sleeve 14 mesh with the gear 17, keyed on the right hand end of power or drive shaft 2, as illustrated by Figs. 3, 4 and 5a, and the gear teeth 15' of sleeve 14' mesh with the intermediate gear 18, which meshes with gear 19 keyed on the left hand end of the power shaft 2, as shown in Figs. 3 and 5. Consequently, when the power or drive shaft 2 is rotated by the motor, sleeve 14 will be rotated in a direction opposite to that of the power shaft 2, while sleeve 14' will be rotated in the same direction as the power shaft.

The circumferential flanges 16, 16' of the sleeves 14, 14' are each provided with equally spaced, circumferentially disposed laterally projecting retainer pins 20, 20' on which are slidably mounted a series of primary clutch or friction discs 21, 21', which thus rotate with said sleeves 14, 14'.

Since the clutch mechanisms carried by the clutch shafts 11, 11a are identical, as mentioned, it will suffice to continue to describe those on one of them in detail. For this purpose the clutch mechanism mounted on clutch shaft 11 will be selected. On the opposite ends of clutch shaft 11 are keyed, so as to rotate with the clutch shaft 11, sleeves or hubs 22, 22', provided with circumferential flanges 23, 23', respectively, and said sleeves carry a series of companion, non-rotatable, but longitudinally slidable clutch discs 24, 24', respectively; said clutch discs 24, 24' being interposed between the clutch discs 21, 21' carried by the sleeves 14, 14'.

Thus by pushing the clutch discs 21 towards the flange 16 of the sleeve 14, frictional engagement will be effected between said clutch discs 21 and 24, causing the rotation of the sleeve 22, and therewith the clutch shaft 11; the sleeve 14 being coupled to the power shaft 2 by means of the meshing gear elements 15 and 17, the rotation of the power shaft 2 will accordingly rotate the clutch shaft 11, but in an opposite direction from that in which the power shaft 2 is rotated. Similarly, by pushing the discs 21' and 24' into frictional engagement, the rotation of the sleeve 22' will be effected and therewith the shaft 11. In this case, since sleeve 14' is coupled to the power shaft 2 by the train of gears illustrated in Fig. 5—this train of gears including intermediate gear 18—the clutch shaft 11 will now be driven in the same direction as the power shaft 2.

On opposite sides of the periphery of the clutch shaft 11 are two-armed, rockable, Y-shaped pressure levers 26, pivotally mounted between lugs 25 on pins 27, see Figs. 4 and 8. The lugs 25 may be formed integral with the shaft 11, or may be affixed thereto by welding. On the clutch shaft 11, and on opposite sides of the Y-shaped pressure levers 26 are longitudinally slidable pressure head assemblies consisting of sleeves 28 and 29 and adjustable pressure heads 32 (see Figs. 3 and 4) one of which pressure head sleeves is shown in perspective in Fig. 7. The cylindrical body of these pressure head sleeves is provided with diametrically opposite longitudinal slots 30, as shown in Figs. 4 and 7 and each receiving one of the arms of the duplicate Y-shaped levers 26. Each of said pressure head sleeves 28, 29 has a threaded portion or hub 31, on which is threaded an adjustable pressure head 32 with an annular flange 33 or 33', thus providing for the adjustment of the position of the pressure heads with respect to the series of cooperating friction discs 21, 21' and 24, 24', see Fig. 4. To hold such adjustment, the pressure heads 32 are held against turning on the hubs 31 of the sleeves 28, 29 by providing locking pins 35, held projected by springs 36, as shown in Fig. 7; and the opposed faces of the pressure heads 32 are provided with a series of holes 37 (see Fig. 9) to receive said locking pins 35.

As now apparent from Fig. 4, when the arms of the Y-shaped pressure levers are rocked clockwise, the pressure sleeve 29 is pushed towards the left by the stem of the Y-shaped pressure levers 26, and the flange 33' of the adjustable pressure head 32 on the left forces the clutch discs 21' and 24' into frictional engagement, thus causing the sleeve 14' to be operatively connected with the clutch shaft 11, and effecting the coupling of the latter to the power shaft 2, thru the medium of the train of gears illustrated by Fig. 5 as above described; the clutch shaft 11 being thus driven in the same direction as the power shaft 2. It will be observed from Fig. 4 that the arms of the Y-shaped levers 26 are constantly disposed in the slots 30 of both pressure sleeves regardless of in which operative position the Y-shaped levers are placed. Thus, when one pressure head assembly is thrust into engagement by the stems of the Y-shaped levers, the other pressure head assembly is prevented from idling rotation by the arms of the Y-shaped levers co-acting with the slots 30 of the slidable sleeve of the disengaged pressure head assembly. When the clutch shaft 11 is to be driven in the opposite direction, by rocking the Y-shaped pressure levers 26 counterclockwise, thus causing the stems to thrust the pressure sleeve 28 into a position opposite to that in which shown in Fig. 4, the frictional engagement of the clutch discs 21', 24' at the left hand end of the clutch shaft 11 will be released, the pressure sleeve 28 will be moved to the right, and the flange 33 of the adjustable pressure head 32 on the right will be forced against the outer of the clutch discs 21, and the frictional engagement of the clutch discs 21, 24, at the right hand end of the clutch shaft 11 will be effected, operatively connecting the sleeve 14 to the clutch shaft 11. Clutch shaft 11 will now be coupled thru gears 15, 17 with the power shaft 2, but will be driven in a direction opposite to that of the power shaft.

The Y-shaped pressure levers 26 are provided on opposite sides of the clutch shaft 11 so as to cause even circumferential pressure to be exerted against the pressure sleeves 28 or 29, and thus assure the proper frictional engagement of the clutch discs.

The rocking of the Y-shaped pressure levers 26, as mentioned, is effected by the actuating sleeve 34, riding, and longitudinally slidable on the pressure sleeves 28, 29.

When the actuating sleeve 34 is in its middle, or neutral position, the pressure levers 26—due to their Y-shape as illustrated in Figs. 8 and 4—will also be in neutral position, thus no motion is transmitted from the power shaft 2 to the clutch shaft 11. But when the actuating sleeve 34 is moved to the right, or the left, the clutch shaft 11 will be correspondingly coupled to the power shaft 2.

The actuating sleeve 34 is provided with a circumferential groove 38. In this groove bear the pins 43 of the yoke 41, spanning the actuating sleeve 34, see Fig. 2. A horizontal, transverse shaft 40 is rigidly supported within the housing 1. On this shaft 40 are mounted hollow, rockable shafts 39, 39'. To one end of the shaft 39 is rigidly fastened said yoke 41, and on the other end of this rockable shaft 39 is a crank arm 42. Links 44 connect the crank arm 42 to a vertically reciprocable rod 45, slidably supported in a guide 72 mounted on the housing 1. When the rod 45 is moved up or down, the yoke 41 is rocked forward or rearward, moving the actuating sleeve 34 forward or rearward, and thereby correspondingly operating the pressure levers 26, and coupling the clutch shaft 11 to the power shaft 2.

The cooperative arrangement of the actuating sleeve 34 and the Y-shaped actuating lever 26 is such that only relatively slight force is required to raise or lower the rod 45 in order to apply a powerful clamping grip between the clutch discs 21 and 24. Thus the moving of one of the rods 45 or 45a operates to cause the rear tractor wheel of that side of the tractor to be driven forward or backward, or to remain at rest.

While the control of the transmission of power from power shaft 2 to one clutch shaft 11 has thus far been described, the transmission of power to the other clutch shaft 11a is controlled identically, but separately, and independently. Thus, as the movement up or down of the rod 45 acts to control the transmission of power to the clutch shaft 11, similarly the movement up or down of the rod 45a controls the transmission of power to the clutch shaft 11a. The clutch shaft 11a operates the rear tractor wheel 6, as illustrated in Fig. 3 and the clutch shaft 11 operates the rear tractor wheel 4.

Each of the rods 45 and 45a has a half round collar 46 mounted rigidly at the top of the rod. The curved periphery of each collar 46 is made with an annular groove 47 (see Figs. 2 and 3). Bell-cranks 48 are pivoted at 48a on the inner side of a handle bar frame 61, provided with handles 49, and said bell cranks 48 are so arranged that one arm engages the groove 47 of the collar 46, as shown in Figs. 1 and 3, and the other arm of the bell crank is connected by a rod 50 to a hand lever 51, or 51a, fulcrumed near the outer end of the handle bars 49. Consequently, movement of the hand levers 51 and 51a by the driver of the tractor moves the corresponding rods 45 or 45a up or down, and operates the corresponding clutch mechanisms. Furthermore, by operating only one of the hand levers 51, 51a driving power is transmitted to one side of the tractor only, causing it to turn to one side, and thereby steering the tractor.

The description thus far has covered the clutch mechanism and its operation and control. Another important feature of my tractor is the manner of mounting the handle frame 61 on my tractor, which I shall now describe. A standard consisting of a top or plate 52, and legs 53, 54 and 55 is rigidly mounted on the housing 1, as shown in Figs. 1 and 3. The plate 52 is made with an annular boss 56. Rotatably mounted on said plate and said boss is the handle frame support 57, which is held in place by a circular retainer plate 58 fastened to the top of boss 56 by screws 59. Handle frame support 57 includes uprights 60, on which the handle bar frame 61 is pivoted. A frame 62 is secured to the sides of said handle frame support 57 below the uprights 60, said frame 62 including integral cross bars 63; and said frame 62 has a U-shaped guide arch 64, vertically mounted at the outer end; said guide arch 64 constituting a vertical guide for the handle frame 61, see Fig. 1. Holes 65 in the guide arch 64 and corresponding longitudinal slots 65' in the handle bar frame 61 are made to accommodate bolts by which the handle bar frame 61 may be secured against movement up or down, if desired. A vertical leg 66 having at the top a horizontal flange 67 is adapted to have the cross bar 63, connecting the sides of frame 62, slide upon it, and thus act as an outer support for the said frame 62. Registering holes 68 permit the crossbar 63 of frame 62 to be bolted to flange 67 if desired, in order to prevent the moving of the frame 62, and its guide arch 64, and the handle bar frame 61, horizontally. Handle frame support 57 is made with a central lateral projection 69 to which is fastened one end of a tension spring 70, the other end of said spring 70 being attached to the lug 71 on handle bar frame 61, so as to hold the latter and therewith the handles 49, at proper height and in normal central position, unless moved by the operator.

It is apparent from the construction thus explained that the operator can move the handle bars 49 up or down, or from one side to the other if desired without disturbing the tractor itself. The advantages hereof are the operator may hold the handle bars at whatever height he wishes and to suit his convenience. Thus when the tractor moves up or down hill, or climbs over small mounds, the handle bars can still be held by the operator at a height convenient to himself. And when the tractor turns, the operator does not have to swing around in a horizontal arc at the end of the handle bars outside of the path of the tractor, but may continue in the path of the tractor, since the handle bars do not have to turn with the tractor when it turns. Also it is possible for the operator to follow the tractor at one side or the other instead of immediately behind the tractor since the handle bars can freely be moved from one side to the other, and this is a decided convenience when the tractor is hitched to certain types of farm implements.

The vertical rods 45, 45a are slidably supported in a guide 72 mounted on the housing 1, as mentioned, and also slide thru holes provided in the retainer plate 58, on the boss 56. The half round collars 46 mounted at the top of the rods 45, 45a have their annular grooves 47 engaged by the bell cranks 48 pivoted on the handle bar frame 61, in the manner already described. The purpose of the circular collars 46 and annular grooves 47 is now apparent, for the turning of the handles 49 and handle bar frame 61 from one side to the other does not in any way interfere with the control of the up and down movement of the rods 45 by the hand levers 51, 51a. In other words, the clutch control is operable from whatever position the operator is standing and holding the tractor handle bars. The operator thus can move the handle bars up or down, or from side to side, not only freely and without disturbing the tractor itself, but also without making any adjustment in the controls. It is not necessary for the operator to do any lifting or dragging of the tractor when desiring to turn it, since mere manipulation of the hand levers 51, 51a is all that is required to turn the tractor in any direction.

As previously mentioned, even tho a heavy load is being pulled by the tractor, only very slight exertion is all that is ever required on the part of the operator to throw in the friction clutches thru the medium of hand levers 51, 51a with ample power to prevent any slippage between the clutch discs. Furthermore in the clutch mechanism which I have invented gear shifts are entirely dispensed with.

For the construction of the clutch discs 21, 24 and 21', 24' various compositions and materials may be used, provided the discs are strong and durable and produce a high coefficient of friction when the discs bear against each other. I have found very satisfactory results obtainable by making the clutch discs of moulded brake material having high tensile strength and sufficient heat resistance, such, for example, as the brake material at present being sold under the trade name "Hi-ball", and brake materials of similar nature.

In the drawings and specification thus far I have shown and described my tractor with two separate clutch shafts 11 and 11a driving the tractor wheels on both sides independently. It is possible, and will frequently be found desirable, in order to reduce the cost of manufacture to make my tractor with only a single clutch shaft, for example eliminating clutch shaft 11 and cooperating devices entirely, and having both tractor wheels 4 and 6 mounted on the same shaft and operatively connected with pinion 12a at the end of clutch shaft 11a. The only advantage in having two clutch shafts is to afford facility in steering the tractor. When only a single clutch shaft is used the tractor wheels on both sides are driven in unison. In other respects my tractor when made with a single clutch shaft operates in the same manner as when made with the two clutch shafts as described.

I claim:

1. In a motor driven tractor provided with a power shaft, clutch mechanism, and a vertically movable rod controlling such clutch mechanism, a handle bar frame support mounted horizontally movable on the body of the tractor, a vertically movable handle bar frame pivoted on said support, a circular collar affixed to the upper end of said rod, said collar provided with a circumferential groove, a bell crank mounted on said handle bar frame, said bell crank having one arm bearing in the groove of said collar and adapted when rocked to raise and lower said rod, a hand lever associated with the handle bars, and a connection between said bell crank and said hand lever.

2. The combination described by claim 1 with means for securing the handle bar frame support against horizontal movement.

3. The combination described by claim 1 with means for securing the handle bar frame support against horizontal movement, and spring means normally holding the handle bars in one position.

4. In a motor driven tractor provided with handle bars, the combination of a power shaft, a pair of parallel clutch shafts, each connected to one of the driving wheels of the tractor, gears on the power shaft, loose gears carried by the clutch shafts and driven by said gears on said power shaft, clutch mechanisms for engaging said loose gears selectively with the clutch shafts and thus operatively connecting the clutch shafts to the power shaft, each of said clutch mechanisms comprising axially slidable disks carried by said loose gears, cooperating clutch disks longitudinally slidable on said clutch shafts and interposed between the first mentioned disks, a member longitudinally slidable on the clutch shaft adapted, by imposing pressure, to cause the engagement of said cooperating disks with the disks carried by said loose gears, a 2-arm Y-shaped rockable operating lever pivoted on the clutch shaft, and a control collar slidable over said lever for operating the same, and means operable from the handle bars for positioning said control collar, whereby selectively to connect the clutch shafts with the power shaft and thus control the direction of travel of the tractor.

5. In a motor driven tractor provided with handle bars, the combination of a power shaft, a pair of parallel clutch shafts, each connected to one of the driving wheels of the tractor, gears on the power shaft, loose gears carried by the clutch shafts and driven by said gears on said power shaft, clutch mechanisms for engaging said loose gears selectively with the clutch shafts and thus operatively connecting the clutch shafts to the power shaft, each of said clutch mechanisms comprising axially slidable disks carried by said loose gears, cooperating clutch disks longitudinally slidable on said clutch shafts and interposed between the first mentioned disks, a member longitudinally slidable on the clutch shaft adapted, by imposing pressure, to cause the engagement of said cooperating disks with the disks carried by said loose gears, a 2-arm Y-shaped rockable operating lever pivoted on the clutch shaft, and a control collar slidable over said lever for operating the same, each of said slidable pressure imposing members having a pressure head threaded thereon, to take up wear on said disks, means cooperating with said slidable pressure imposing members for holding said pressure heads against rotation on said pressure imposing members, and means operable from the handle bars for positioning said control collar, whereby selectively to connect the clutch shafts with the power shaft and thus control the direction of travel of the tractor.

6. In a motor driven tractor the combination of a power shaft, a pair of parallel clutch shafts, each connected to one of the driving wheels of the tractor, gears on the power shaft, loose gears carried by the clutch shafts and driven by said gears on said power shaft, clutch mechanisms for engaging said loose gears selectively with the clutch shafts and thus operatively connecting the clutch shafts to the power shaft, each of said clutch mechanisms comprising axially slidable disks carried by said loose gears, cooperating clutch disks longitudinally slidable on said clutch shafts, and interposed between the first mentioned disks, a member longitudinally slidable on the clutch shaft adapted, by imposing pressure, to cause the engagement of said cooperating disks with the disks carried by said loose gears, a 2-arm Y-shaped rockable operating lever pivoted on the clutch shaft, and a control collar slidable over said lever for operating the same, each of said slidable pressure imposing members having a pressure head threaded thereon, to take up wear on said disks, spring-controlled, retractable locking-pins extending between each pressure imposing member and its adjustable pressure head for securing said pressure head against rotation.

7. The combination described by claim 6 with addition of handle bars on said tractor and means operable from the handle bars for positioning said control collar, whereby selectively to connect the clutch shafts with the power shaft and thus control the direction of travel of the tractor.

8. In a motor driven tractor having handle bars, the combination of a power shaft, a clutch shaft parallel to said power shaft, said clutch shaft connected to a driving wheel of the tractor, a pair of gears rotatably mounted on opposite ends of said clutch shaft, said gears driven in opposite directions from said power shaft, friction clutch disks carried by each of said gears, two sets of cooperating friction clutch disks longitudinally slidable on said clutch shaft adapted to engage the clutch disks of said gears, respectively, a pair of slidable pressure applying members mounted on said clutch shaft between said sets of cooperating disks, an adjustable pressure head threaded on each of said pressure applying members, spring-controlled, retractable locking pins holding each of said pressure heads against rotation with respect to its pressure applying member, an operating element pivoted on said clutch shaft between said pair of slidable pressure applying members, and means, associated with the handle bars, for controlling said operating element.

9. In a power driven device, a driving transmission, and a clutch mechanism controlling said driving transmission, said clutch mechanism including a pressure applying member and an adjustable pressure head threaded on said member and spring controlled, retractable locking pins extending between said member and said adjustable pressure head for holding said pressure head in position on said member.

10. In a motor driven tractor provided with handle bars the combination of a power shaft, a pair of parallel clutch shafts, each connected to one of the driving wheels of the tractor, gears on the power shaft, loose gears carried by the clutch shafts and driven by said gears on said power shaft, clutch mechanisms for engaging said loose gears selectively with the clutch shafts and thus operatively connecting the clutch shafts to the power shaft, each of said clutch mechanisms comprising axially slidable discs carried by loose gears, cooperating clutch discs longitudinally slidable on said clutch shafts and interposed between the first mentioned discs, a member longitudinally slidable on the clutch shaft adapted, by imposing pressure, to cause the engagement of said cooperating discs with the discs carried by said loose gears, a two-armed, Y-shaped rockable operating lever pivoted on the clutch shaft, a control collar slidable over said lever for operating the same, each of said slidable pressure imposing members having a pressure head threaded thereon to take up wear on said discs, and means cooperating with said slidable pressure imposing members for holding said pressure heads against rotation on said members.

11. In a power driven device having a clutch shaft, the combination of two spaced, independent, oppositely driven power transmitting units rotatably mounted on said clutch shaft, a pair of clutch mechanisms comprising axially slidable discs carried by said units, cooperating discs axially slidable on said clutch shaft and engageable with said first mentioned discs, and a pair of pressure imposing sleeve members between said clutch mechanisms axially slidable on said clutch shaft, an adjustable pressure-head threaded on each of said pressure imposing sleeves, releasable means for holding each pressure-head from inadvertent rotation on the respective pressure imposing sleeve, a rockable, two-armed, Y-shaped lever pivoted on said clutch shaft between said pressure imposing sleeves, slots provided in said pressure imposing sleeves, the arms of said Y-shaped lever extending into said slots, whereby said pressure imposing sleeves are held against rotation on said clutch shaft but will rotate with it, and means for operating said Y-shaped lever.

12. In a power driven device having a clutch shaft, the combination of two spaced, independent, oppositely driven power transmitting units rotatably mounted on said clutch shaft, a pair of clutch mechanisms comprising axially slidable discs carried by said units, cooperating discs axially slidable on said clutch shaft and engageable with said first mentioned discs, and a pair of pressure imposing sleeve members between said clutch mechanisms axially slidable on said clutch shaft, an adjustable pressure-head carried by each of said pressure imposing sleeves, releasable means for holding each pressure-head from inadvertent rotation on the respective pressure imposing sleeve, a rockable, two-armed, Y-shaped lever pivoted on said clutch shaft between said pressure imposing sleeve, slots provided in said pressure imposing sleeves, the arms of said Y-shaped lever extending into said slots, whereby said pressure imposing sleeves are held against rotation on said clutch shaft but will rotate with it, a control collar slidable over said lever for operating the same, and means for positioning said control collar.

SAMUEL WEISS.